[Patent No.] 3,342,640
[Patented] Sept. 19, 1967

3,342,640
ACTIVE ELECTRODE MATERIAL FOR ALKALINE CELLS
Charles Victor Herold and André Léon Kahn, Paris, France, assignors to Société des Accumulateurs Fixes et de Traction (Societe Anonyme), Pont-de-la-Folie, Romainville, France, a French company
No Drawing. Filed Dec. 5, 1963, Ser. No. 328,206
Claims priority, application France, Dec. 8, 1962, 918,003, 918,004
3 Claims. (Cl. 136—28)

This invention relates to new active materials for electrodes of storage cells using aqueous electrolyte, and particularly for the positive electrodes of alkaline storage cells.

Nickel hydroxide is widely used as the active material for positive electrodes of alkaline storage cells. The electrode material is either compressed into pockets or contained in tubes of a perforated nickel-plated steel electrode, or introduced into the pores of a porous carrier. This nickel hydroxide is generally made from a solution of a water soluble nickel salt by precipitation with a strong base such as sodium hydroxide. The nickel hydroxide precipitate is then washed, dried and granulated.

Because of its low electrical conductivity nickel hydroxide is mixed in common practice with an electrically conductive material before incorporation in an electrode. Graphite flakes and nickel flakes are common electrically conductive materials for this purpose. Graphite flakes may be mixed in amounts of about 20% of the total weight of the mixture before filling the electrode pockets. Electrode tubes may contain nickel flakes admixed in amounts of about 12 to 15% by weight of flakes and 85 to 88% nickel hydroxide, with the nickel flakes and the nickel hydroxide in thin alternate layers.

A drawback to nickel hydroxide compositions as above described is their low efficiency. The actual capacity of electrodes containing the aforedescribed nickel hydroxide compositions as the active material is considerably below the theoretical capacity, and is frequently only about 60% of theoretical capacity.

An object of this invention is to produce novel compositions for use as electrode materials having a higher efficiency than the materials now used.

A further object of this invention is to prepare a composition of matter which includes as one component an electrochemically active material and which has a capacity and efficiency higher than that of the electrochemically active material. The other component will be referred to as a potentiating oxide.

A further object according to a specific embodiment of the invention is to prepare hydrated nickel aluminate compositions which have higher efficiency than the presently used nickel hydroxide compositions.

These and other objects will be apparent from the disclosure which follows.

The novel compositions of this invention comprise an electrochemically active material, which is a metal or metal oxide capable of electrochemical oxidation and reduction, and an oxide which hereafter will be called potentiating oxide selected from the group consisting of amphoteric metal oxides and oxides of metals which are able to yield complex oxides in combination with the first oxide.

A preferred electrochemically active material is nickel oxide. Other electrochemically active materials include cobalt oxide, bismuth oxide, cerium oxide, lead oxide, silver, and silver oxide.

Hydrated alumina is a preferred amphoteric oxide. As an alternate to an amphoteric oxide, an oxide which is able to yield complex oxides with any of the aforementioned active materials may be used. These oxides are hydrated. The oxides of indium, gallium, iron, chromium, zinc, titanium, manganese, cerium, lead, bismuth, vanadium, molybdenum, tungsten, silicon, zirconium, tantalum, niobium and similar metal oxides, may be used as potentiating oxides. A few oxides such as cerium oxide and lead oxide may serve as either an active material or as a potentiating oxide, but a single oxide is not used in both capacities in the same composition. In other words, the active material and the potentiating oxide are always different substances.

The active material is preferably present in amounts ranging from about 50 to 65% by weight of the total composition. The potentiating oxide constitutes not more than 30% of the total weight of the composition, and is preferably in the range of about 5 to 20% of the total. It is preferred to use hydrated forms of the oxides. Water makes up the balance of the compositions. Amounts in all compositions herein are expressed in terms of the corresponding oxides.

A preferred composition according to the present invention is a novel nickel aluminate containing from about 50 to 65% NiO and from about 5 to 20% by weight of $Al_2O_3$. Compositions having approximately 10% by weight of $Al_2O_3$ are especially preferred.

In order to increase the electrical conductivity of the material nickel flakes or graphite flakes may be admixed with the novel composition of active material and amphoteric oxide. The amount of nickel flakes according to the present invention is commonly in the range of about 10 to 30% by weight of the total composition. The amount of graphite flakes may also be in this range.

Compositions according to this invention may be prepared in either one or two ways, depending upon the particular materials which constitute the composition.

Physical admixture of the constituents is one method for preparing compositions of this invention.

Intimate mixtures of comminuted oxides may be heated to suitable temperatures in order to increase the diffusion rate. Thus for example spinels such as aluminum oxide-nickel oxide are obtained by heating a mixture of alumina with nickel oxide in suitable proportions such as those in Example II. The anhydrous products thus obtained by thermal means must be submitted to an electrochemical formation which is often more difficult than with the hydrated products obtained at lower temperature. It is possible to sinter such mixtures of oxides which have either been previously compressed or not, at a suitable temperature.

A second method which may be used is the coprecipitation of an oxide of the electrochemically active material and the amphoteric metal oxide from aqueous solution. This is the preferred method where applicable. An aqueous solution of a water soluble salt of the electrochemically active metal and a water soluble salt corresponding to the amphoteric oxide is prepared, and a basic reagent in aqueous solution is admixed with the salt solution. This results in precipitation of the electrochemically active metal oxide and the amphoteric metal oxide, both in hydrated form. The solution of the nitrates of the electrochemically active metal and of the metal corresponding to the amphoteric oxide is preferred. Preferred basic precipitants are the alkali metal hydroxide and especially sodium hydroxide. The precipitate is washed and dried.

An especially preferred composition prepared by the precipitation process is precipitated nickel aluminate. This material is prepared by precipitation from an aqueous solution of a soluble nickel salt and a soluble aluminum salt. In a preferred embodiment, an aqueous solution of nickel nitrate and aluminum nitrate is mixed with an aqueous solution of sodium hydroxide. This process is preferably carried out at an elevated temperature. The aluminum oxide content of the product is not completely eliminated even after repeated treatment with sodium hydroxide, indicating that the product is a new compound and not a mixture of nickel oxide and aluminum oxide. X-ray analysis by the Laüe spectrum also shows that the resulting product is a well defined product and not merely a mixture of the two hydroxides.

This invention will now be described with reference to the specific examples which follow.

*Example I*

One part by weight of crystallized hydrated aluminum nitrate and three parts of crystallized nickel nitrate were dissolved in twelve parts of distilled water. A 110-gram per liter solution of pure sodium hydroxide was prepared. The amount of sodium hydroxide required for precipitating the nickel and aluminum from their nitrates as a hydrated nickel aluminate was calculated and a 5% excess of sodium hydroxide was used for precipitation. The nitrate solution was heated to 95° C. and slowly poured with stirring into the sodium hydroxide solution which had been previously heated to 85° C. After the hydrated aluminate had been precipitated it was filtered and dried and then the product was washed in hot distilled water until the filtrate was neutral and then dried. The product thus obtained was jade green. Chemical analysis of the product, in parts by weight was as follows: NiO, 57.45%; $Al_2O_3$, 9.91%; $H_2O$, 32.64%.

This product corresponds to the empirical formula 7.92 $NiO.Al_2O_3.18.64\ H_2O$.

X-ray analysis shows that the above product is not a mixture of the two hydroxides but a compound with well defined characteristics.

The contents of NiO, $Al_2O_3$ and water may be varied according to the proportions of nickel and aluminum undergoing reaction.

Table 1 below gives the compositions of a few hydrated aluminates which can be prepared by varying the proportions of nickel and aluminum nitrates. Percentages in this table are percent by weight.

TABLE 1

| Run No. | Percent NiO | Percent $Al_2O_3$ | Percent $H_2O$ |
| --- | --- | --- | --- |
| 1 | 57.45 | 9.91 | 32.64 |
| 2 | 59.47 | 5.67 | 34.86 |
| 3 | 59.77 | 10.40 | 29.83 |
| 4 | 63.75 | 7.34 | 28.91 |

The active material prepared as above described is mixed with graphite flakes. The resulting composition is then placed in perforated pockets in nickel-plated steel electrode carriers. Compositions of the above active material with nickel flakes may also be prepared and placed in perforated nickel-plated tubes, preferably in alternating layers. Examples of such compositions are give in Table 2.

TABLE 2

| Run No. | Nickel hydrated aluminate, gm. | Corresponding $Ni(OH)_2$, gm. | Percent, $Al_2O_3$ | Flakes (percent) |
| --- | --- | --- | --- | --- |
| 1 | 5.54 | 3.93 | 9.91 | 15.4 |
| 2 | 5.74 | 4.22 | 5.67 | 17.4 |
| 3 | 5.91 | 4.37 | 10.40 | 16.6 |
| 4 | 5.54 | 4.37 | 7.34 | 26 |
| Control A | | 7.43 | 0 | 12.5 |

Control A consists of nickel hydroxide and nickel flakes.

Table 3 below gives the theoretical and actual capacities in ampere hours for each of the active materials given in Table 2. This table also gives the efficiency of each electrode, which is the ratio of the actual capacity to the theoretical capacity. The theoretical capacity is 0.288 amperes hour for each gram of $Ni(OH)_2$ present.

TABLE 3

| Run No. | Amp.-hrs. per gm. $Ni(OH)_2$ | Theoretical capacity, amp.-hrs. for $Ni(OH)_2$ | Actual capacity, amp.-hrs. | Efficiency (percent) |
| --- | --- | --- | --- | --- |
| 1 | 0.254 | 1.13 | 1 | 88 |
| 2 | 0.234 | 1.22 | 0.99 | 81 |
| 3 | 0.228 | 1.26 | 1 | 79 |
| 4 | 0.183 | 1.26 | 0.80 | 63 |
| Control A | 0.175 | 2.14 | 1.30 | 61 |

It may be seen from the above data that nickel aluminate is far superior to nickel hydroxide as the active material for a positive electrode of an alkaline cell.

The capacity in ampere hours per gram of active material in a tube filled with hydrate nickel aluminate is best when the aluminum content expressed by $Al_2O_3$ is about 10% by weight.

The discharge voltage of electrodes filled with the active material of this invention is about 0.03 to 0.05 volt higher at the same discharge rate than that of a tube filled with nickel hydroxide manufactured by the standard process, and in the same amount.

Moreover the loss of capacity of a tube charged and manufactured according to this invention when not in use is lower than that of a standard tube.

*Example II*

A solution of 140 grams per liter of nickel nitrate (anhydrous) and 45 grams per liter of aluminum nitrate (anhydrous) was mixed with sodium hydroxide solution according to the procedure of Example I.

The product was filtered, washed and dried at a temperature under 100° C. The product is jade green and has the following chemical analysis:

NiO, 57.7%; $Al_2O_3$, 10.8%; $H_2O$, 31.5%.

This corresponds to the empirical formula 7.3 $NiO.Al_2O_3.16.5\ H_2O$.

X-ray analysis shows that this product is a well defined product and not a mixture of the two hydroxides.

Various hydrated nickel aluminates which are prepared according to the procedure of Example II except for changes in the proportion of nickel nitrate and aluminum nitrate in the salt solution are given in Tables 4 to 6 which follow. The product of Example II is designated as Run No. 6 in these tables.

Table 4 gives the compositions of hydrated nickel aluminates prepared according to this example.

TABLE 4

| Run No. | NiO | $Al_2O_3$ | $H_2O$ |
| --- | --- | --- | --- |
| 5 | 55.04 | 7.52 | 37.44 |
| 6 | 57.7 | 10.8 | 31.5 |
| 7 | 51.72 | 16.21 | 32.7 |

Table 5 illustrates the admixture of the nickel aluminate compositions of Table 4 with nickel flakes in order to produce an active material for positive plates of alkaline storage cells. The compositions thus prepared are given in Table 5. For purposes of comparison, a control designated Control B which consist of nickel hydroxide and nickel flakes, is also given.

TABLE 5

| Run No. | Total wt. in gms. | Nickel flakes in gms. | Nickel aluminate in gms. | NiO in gms. | $Ni(OH)_2$ in gms. | $Al_2O_3$ in gms. | $Al_2O_3$ percent content |
| --- | --- | --- | --- | --- | --- | --- | --- |
| Control B | 7.70 | 0 | 0.95 | | 6.75 | 0 | 0 |
| 5 | 7.00 | 5.02 | 1.190 | 3.24 | 4.02 | 0.443 | 7.52 |
| 6 | 7.310 | 6.005 | 1.225 | 3.51 | 4.35 | 0.657 | 10.8 |
| 7 | 5.900 | 5.160 | 1.790 | 2.67 | 3.31 | 0.836 | 16.21 |

Table 6 which follows gives the performance characteristics of the compositions illustrated in Table 5.

TABLE 6

| Run No. | Theoretical capacity, amp.-hrs. | Real capacity, amp.-hrs. | Amp.-hrs. per gram of Ni(OH)$_2$ | Efficiency (percent) |
|---|---|---|---|---|
| Control B | 1.94 | 1.18 | 0.175 | 61 |
| 5 | 1.16 | 0.80 | 0.200 | 69 |
| 6 | 1.24 | 1.0 | 0.230 | 79 |
| 7 | 0.95 | 0.85 | 0.256 | 90 |

As will be seen, the capacity in ampere hours per gram of nickel hydroxide is increased as a content of aluminum oxide increases within the limits of the tests above described. This shows that the presence of minor amounts of aluminum oxide is of pronounced benefit in increasing the capacity and efficiency of the electrode material.

Other potentiating oxides than aluminum oxide have been successfully used with nickel hydroxide. One of the most interesting is zinc oxide. Nickel zincate may be used instead of nickel aluminate.

The efficiency of other electrode materials may be increased in a similar manner. Thus for example in an alkaline silver-zinc storage cell wherein silver is the positive active material, silver in association with a potentiating metal oxide such as ceric oxide (CeO$_2$) or an oxide of iron, the electrochemical capacity is very similar to that obtained with silver alone, and migration to the separators is considerably reduced. In this case silver ferrates for instance have been used as the above-mentioned nickel aluminate.

The teachings of this invention can also be followed in making electrode materials and especially positive electrode materials for other cells, such as manganese oxide-zinc and mercury oxide-zinc primary cells, and lead-acid (lead oxide-lead) secondary cells.

Electrodes according to this invention comprise an active material as above described supported by a conductive carrier. The carrier may be a conventional carrier containing spaces for supporting the active material as known in the art. Thus, for example, the carrier may be a porous carrier in which the active material is contained in the pores, or the carrier may be in the form of perforated tubes or pockets for containing the active material.

While this invention has been described with reference to specific embodiments thereof, these are only for the purpose of illustration, and the scope of the invention is not limited thereby.

We claim:
1. In an alkaline storage battery comprising in combination therewith a carrier for active material, said carrier containing as the active material a hydrated nickel aluminate consisting essentially of 50 to 65% by weight NiO, 5 to 20% by weight Al$_2$O$_3$, balance essentially water.

2. In an alkaline storage battery comprising in combination therewith a carrier for active material, said carrier containing as the active material a hydrated nickel aluminate containing 50 to 65% by weight NiO and 5 to 20% by weight Al$_2$O$_3$.

3. In an alkaline storage battery comprising in combination therewith a carrier for active positive materials, said carrier containing as the active material (a) a hydrated nickel aluminate containing 50 to 65% by weight NiO and 5 to 20% by weight Al$_2$O$_3$ and (b) flakes of an electrically conductive material selected from the group consisting of graphite and nickel.

References Cited

UNITED STATES PATENTS

| | | | |
|---|---|---|---|
| 1,955,115 | 4/1934 | Drumm | 136—28 X |
| 3,162,607 | 12/1964 | Burbidge et al. | 252—461 X |
| 3,189,563 | 6/1965 | Hauel | 252—461 X |
| 3,205,182 | 9/1965 | Padovani et al. | 252—461 X |
| 3,228,795 | 1/1966 | Ackermann | 136—29 |
| 3,228,892 | 1/1966 | Cole et al. | 252—461 X |

WINSTON A. DOUGLAS, *Primary Examiner.*

B. J. OHLENDORF, A. SKAPARS, *Assistant Examiners.*